(12) United States Patent
An

(10) Patent No.: US 10,379,578 B2
(45) Date of Patent: Aug. 13, 2019

(54) FLEXIBLE DISPLAY DEVICE AND DRIVING METHOD THEREOF

(71) Applicant: Samsung Display Co., Ltd, Yongin-si, Gyeonggi-do (KR)

(72) Inventor: Min Su An, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 7 days.

(21) Appl. No.: 15/134,695

(22) Filed: Apr. 21, 2016

(65) Prior Publication Data

US 2017/0031518 A1    Feb. 2, 2017

(30) Foreign Application Priority Data

Jul. 27, 2015 (KR) .......................... 10-2015-0106137

(51) Int. Cl.
*G06F 3/041* (2006.01)
*G06F 1/16* (2006.01)
*H04M 1/02* (2006.01)

(52) U.S. Cl.
CPC ......... *G06F 1/1652* (2013.01); *H04M 1/0268* (2013.01)

(58) Field of Classification Search
CPC .... G06F 3/0418; G06F 1/1652; G06F 3/0414; G06F 3/046; G06F 2203/04102; G06F 3/0412
USPC ........................................................ 345/173
See application file for complete search history.

(56) References Cited

U.S. PATENT DOCUMENTS

| 4,641,026 | A  | * | 2/1987  | Garcia, Jr. ............ | G06F 3/0202 250/229 |
| 4,937,444 | A  | * | 6/1990  | Zimmerman ........ | A61B 5/1126 250/221 |
| 5,684,297 | A  | * | 11/1997 | Tardy ................ | G01D 5/35383 250/227.14 |
| 6,525,677 | B1 | * | 2/2003  | Printzis ................ | H03K 17/943 178/18.09 |
| 7,295,724 | B2 | * | 11/2007 | Wang .................. | A61B 5/6892 385/13 |
| 7,352,951 | B2 | * | 4/2008  | Gotfried .............. | G02B 6/0008 362/559 |
| 7,655,901 | B2 | * | 2/2010  | Idzik .................... | G06F 3/0202 250/221 |
| 8,223,128 | B1 | * | 7/2012  | Edwards .............. | G06F 3/0202 345/170 |
| 2009/0219247 | A1 | * | 9/2009 | Watanabe ............ | G06F 1/1615 345/157 |
| 2010/0141605 | A1 | * | 6/2010 | Kang .................... | G06F 1/1626 345/174 |

(Continued)

FOREIGN PATENT DOCUMENTS

KR  10-2013-0135120 A  12/2013
KR  10-2014-0019058 A   2/2014
(Continued)

*Primary Examiner* — Benyam Ketema
(74) *Attorney, Agent, or Firm* — Innovation Counsel LLP

(57) ABSTRACT

A flexible display device, comprising: a flexible display panel; and at least one displacement sensor, which is disposed at a boundary region of the flexible display panel, emitting emission waves and receiving reflected waves, wherein the reflected waves are emission waves that are returning after being reflected, and determining a bend angle of the flexible display panel according to a displacement calculated based on the reflected waves.

20 Claims, 7 Drawing Sheets

(56) References Cited

U.S. PATENT DOCUMENTS

| | | | | |
|---|---|---|---|---|
| 2011/0057873 | A1* | 3/2011 | Geissler | G06F 1/1626 |
| | | | | 345/156 |
| 2012/0312956 | A1* | 12/2012 | Chang | G06F 3/017 |
| | | | | 250/201.1 |
| 2013/0265257 | A1* | 10/2013 | Jung | G06F 3/0412 |
| | | | | 345/173 |
| 2014/0334767 | A1* | 11/2014 | Lim | G01L 1/246 |
| | | | | 385/13 |
| 2015/0062025 | A1 | 3/2015 | Lee et al. | |
| 2015/0169091 | A1* | 6/2015 | Ho | G06F 3/044 |
| | | | | 345/173 |
| 2016/0070304 | A1* | 3/2016 | Shin | H04M 1/0268 |
| | | | | 361/679.26 |

FOREIGN PATENT DOCUMENTS

| | | |
|---|---|---|
| KR | 10-2014-0120282 A | 10/2014 |
| KR | 10-2015-0020805 A | 2/2015 |
| KR | 10-2015-0026537 A | 3/2015 |

* cited by examiner

303

304

305

306

307

FLEXIBLE DISPLAY DEVICE AND DRIVING METHOD THEREOF

CROSS-REFERENCE TO RELATED APPLICATION

This application claims priority to and the benefit of Korean Patent Application No. 10-2015-0106137 filed in the Korean Intellectual Property Office on Jul. 27, 2015, the entire content of which is incorporated herein by reference.

BACKGROUND (a) Technical Field

The present disclosure relates to a flexible display device and a driving method thereof, and more particularly, to a flexible display device and a driving method thereof which comprise a displacement sensor.

(b) Description of the Related Art

The next generation display device comprises a flexible display device. New form-factors for a flexible display device may be produced based on new types of user inputs that take advantage of the flexibility of the device, such as bending (bend-based), twisting (twist-based), etc. Calculating the bend amount of the flexible display device is required to apply the bend-based user input to the flexible display. Furthermore, information from the bend amount may be used to diagnose the lifetime stress of the flexible display device.

Conventionally, pressure sensors or resistor sensors are used to calculate the bend amount or bend angle of the flexible display device. However, where pressure sensors or resistor sensors are used, it is sometimes difficult to distinguish between the different bend directions of the flexible display device, i.e., whether it is concavely bent or convexly bent.

The above information disclosed in this Background section is only to enhance the understanding of the background of the invention, and therefore it may contain information that does not form the prior art that is already known in this country to a person of ordinary skill in the art.

SUMMARY

The present disclosure has been made in an effort to provide a flexible display device and a driving method thereof having advantages of being able to accurately distinguish between different bend angles and bend directions.

An exemplary embodiment provides a flexible display device, comprising: a flexible display panel; and at least one displacement sensor that is disposed at a boundary region of the flexible display panel. The displacement sensor emits emission waves and receives reflected waves, which are emission waves that are returning after being reflected, and determines a bend angle of the flexible display panel according to a displacement calculated based on the reflected waves.

The emission waves may be at least one of electromagnetic waves and ultrasonic waves.

The displacement sensor may emit the emission waves to a protruding unit of the flexible display panel, and the flexible display device may calculate the displacement based on the reflected waves, which are returning emission waves that are reflected at the protruding unit.

The displacement sensor may measure the displacement by using at least one of a time difference between the emission time of the emission waves and the reception time of the reflected waves and the incident angle of the reflected waves.

The emission waves may be directed toward the flexible display panel at an angle with reference to a horizontal direction of the flexible display panel, wherein the flexible display panel is in a flat state.

The flexible display device may determine the bend direction of the flexible display panel based on a change in the displacement, wherein the change comprises one of an increase and a decrease.

The bend direction may comprise: a convex direction, wherein the change is an increase; and a concave direction, wherein the change is a decrease.

The flexible display device may further comprise a transparent layer, wherein the displacement sensor is disposed on the flexible display panel and the transparent layer is disposed on the flexible display panel, wherein the height of the transparent layer is about the same as the height of the displacement sensor.

The displacement sensor may be integrally formed within the flexible display panel.

The flexible display device may further comprise a touch panel which is disposed on the flexible display panel, wherein the displacement sensor is integrally formed within the touch panel.

The flexible display device may further comprise a plurality of displacement sensors, wherein the plurality of displacement sensors emit the emission waves in a temporally-divided manner.

The flexible display device may further comprise a plurality of displacement sensors, wherein the plurality of displacement sensors emit the emission waves in a frequency-divided manner.

The flexible display device may use at least one of the bend angle and the bend direction as a user input.

An exemplary embodiment provides a driving method of a flexible display device, comprising: emitting, by using at least one displacement sensor, emission waves which are at least one of electromagnetic waves and ultrasonic waves toward a flexible display panel; receiving reflected waves which are returning reflected emission waves from the flexible display panel; measuring displacement by using the reflected waves; and determining a bend angle of the flexible display panel based on the displacement.

The measuring the displacement may comprise measuring the displacement by using at least one of a time difference between the emission time of the emission waves and the reception time of the reflected waves and an incident angle of the reflected waves.

Emitting the emission waves may comprise emitting the emission waves toward the flexible display panel at an angle with reference to a horizontal direction of the flexible display panel, wherein the flexible display panel is in a flat state.

The driving method may further comprise determining a bend direction of the flexible display panel based on a change in the displacement, wherein the change comprises one of an increase and a decrease.

The bend direction may comprise a convex direction, wherein the change is an increase; and a concave direction, wherein the change is a decrease.

According to an exemplary embodiment, it is possible to provide a flexible display device which can determine a bend direction and a bend angle, and the driving method thereof.

DETAILED DESCRIPTION OF THE EMBODIMENTS

Figure 1:
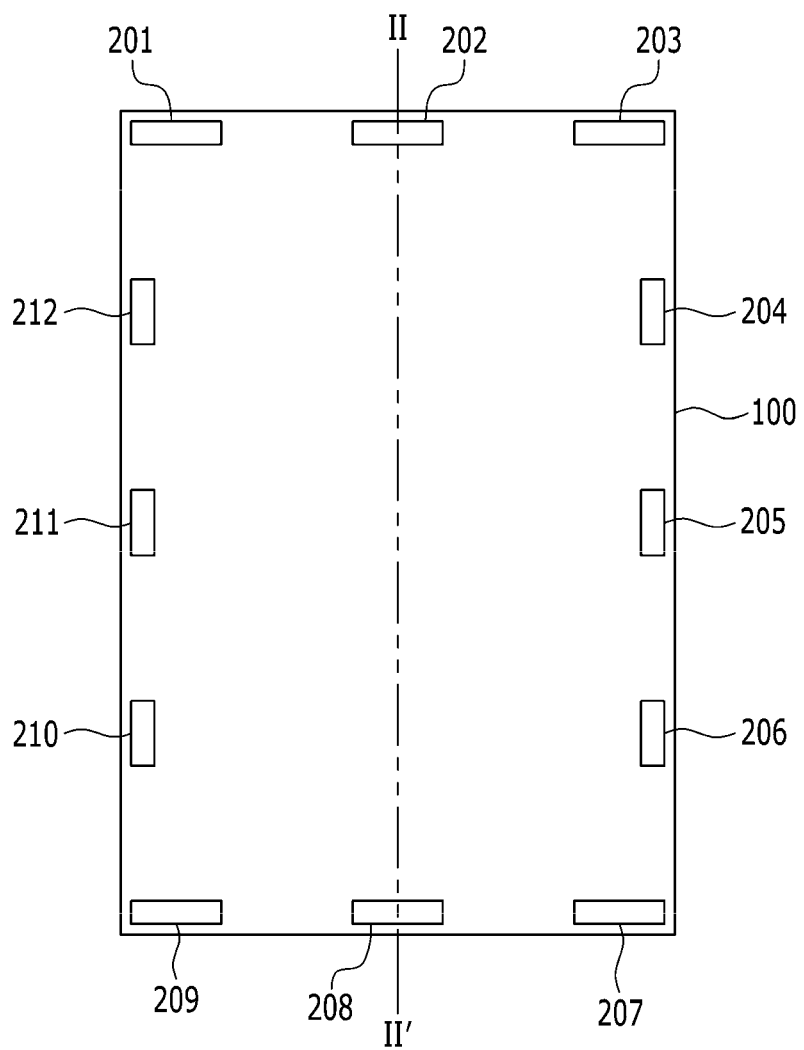
FIG. 1 is a top plan view of a flexible display device according to an exemplary embodiment.

The present disclosure will be described more fully hereinafter with reference to the accompanying drawings, in which exemplary embodiments are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, unless explicitly described to the contrary, the word "comprise" and variations such as "comprises" or "comprising", will be understood to imply the inclusion of stated elements but not the exclusion of any other elements.

Figure 2:
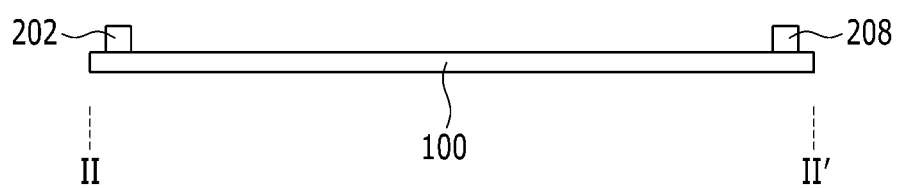
FIG. 2 is a cross-sectional view of the flexible display device according to line II-II' of FIG. 1.

FIG. 1 is a top plan view of a flexible display device according to an exemplary embodiment, and FIG. 2 is a cross-sectional view of the flexible display device according to line II-II' of FIG. 1.

Referring to FIGS. 1 and 2, a flexible display device 10 comprises a flexible display panel 100 and displacement sensors 201, 202, 203, 204, 205, 206, 207, 208, 209, 210, 211, 212.

Elements in FIGS. 1 to 10 are illustrated to explain how to measure displacements by using the displacement sensors 201, 202, 203, 204, 205, 206, 207, 208, 209, 210, 211, and 212 based on a bend angle and a bend direction of the flexible display panel 100. Therefore, the flexible display device 10 may further comprise other elements that commonly constitute a cell phone, a tablet computer, or other electronic device.

The flexible display panel 100 may be an organic light emitting diode display panel or a liquid crystal display panel.

The flexible display device 10 may further comprise a touch panel, which may be disposed on the flexible display panel 100, and the touch panel and the flexible display panel 100 may be integrally formed, as a single unit.

A person of an ordinary skill in the art may refer to the flexible display panel 100 as a display module when the flexible display panel 100 is connected to a Digital Signal Processor (DSP) through a Flexible Printed Circuit Board (FPCB), and a person of an ordinary skill in the art may refer to the flexible display panel 100 as a display device when it further comprises other elements. In other words, the scope of the present disclosure should not be limited solely by the type of the flexible display panel 100. In the present disclosure, the flexible display device 10 is distinguished from the flexible display panel 100, based on whether or not it comprises the displacement sensors (e.g., displacement sensors 201, 202, 203, 204, 205, 206, 207, 208, 209, 210, 211, and 212).

Although the plurality of displacement sensors 201, 202, 203, 204, 205, 206, 207, 208, 209, 210, 211, and 212 are illustrated in FIG. 1, a flexible display device of another embodiment of the present disclosure may comprise only one displacement sensor. Even though the flexible display device 10 with the plurality of displacement sensors 201, 202, 203, 204, 205, 206, 207, 208, 209, 210, 211, and 212 can detect many various user inputs, the flexible display device with only one displacement sensor also can detect the bend angle and the bend direction. For example, in FIGS. 3 to 8, displacement sensors 202 and 202b can detect the bend angle and the bend direction by using reflected waves from the flexible display panel 100 and 100b, without the aid of other displacement sensors 208 and 208b. The inventive concept is not limited to any specific number of displacement sensors.

The displacement sensors 201, 202, 203, 204, 205, 206, 207, 208, 209, 210, 211, and 212 are disposed at a boundary region of the flexible display panel 100. The displacement sensors 201, 202, 203, 204, 205, 206, 207, 208, 209, 210, 211, and 212 emit emission waves toward the flexible display panel 100, and receive and use reflected waves which are returning the reflected emission waves from the flexible display panel 100. Therefore, it is desired that the displacement sensors 201, 202, 203, 204, 205, 206, 207, 208, 209, 210, 211, and 212 be disposed at the boundary region of the flexible display panel 100 in which a range of measurable displacement is widest. In other words, in the case that the displacement sensors 201, 202, 203, 204, 205, 206, 207, 208, 209, 210, 211, and 212 are disposed at the boundary region of the flexible display panel 100, the range of measureable displacement in an opposite direction from each displacement sensor (a displacement between an edge and an opposite edge of the flexible display panel 100) may be the maximum range of measureable displacement. In another embodiment, displacement sensors may be disposed at the center of a flexible display panel. Even though the range of measureable displacement (a displacement from the center of the flexible display panel to an opposite edge of the flexible display panel) may be reduced compared to the above case, the concept of the present disclosure can still be applied.

Figure 3:
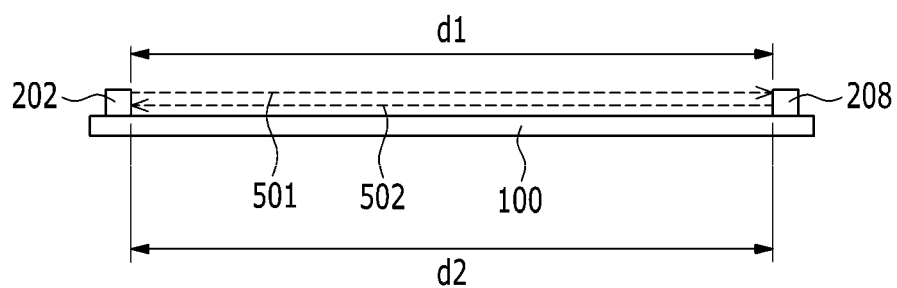
FIGS. 3, 4, and 5 illustrate a method of determining a bend angle of the flexible display device.
Figure 4:
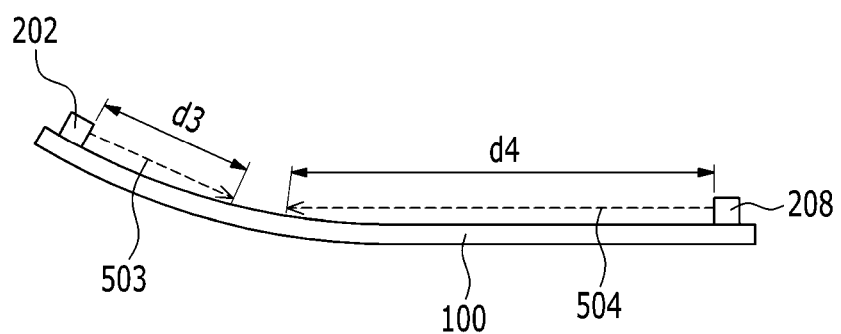
Figure 5:
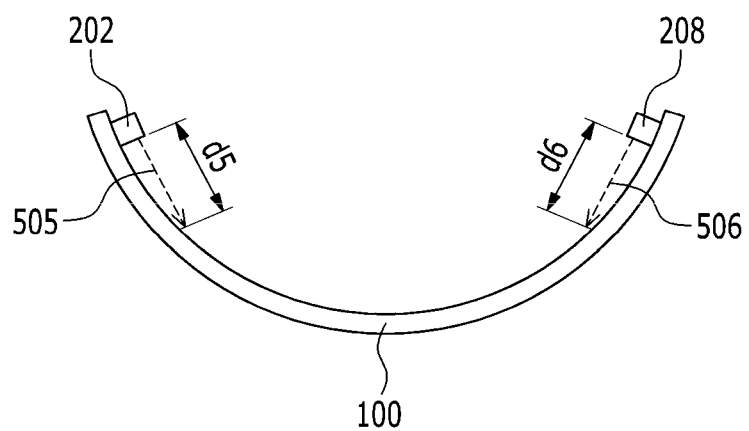

FIGS. 3 to 5 illustrate a method of determining a bend angle of the flexible display device.

Referring to FIGS. 3 to 5, the method of determining the bend angle of the flexible display panel 100 is illustrated by using two displacement sensors 202 and 208. A person of an ordinary skill in the art should understand that the same concept of the present disclosure can be applied to the other displacement sensors 201, 203, 204, 205, 206, 207, 209, 210, 211, and 212.

The displacement sensor 202 emits emission waves 501 toward the displacement sensor 208, substantially parallel to the surface of the flexible display panel 100 in an unbent state, and receives reflected waves which are returning reflections of the emission waves 501 from the displacement sensor 208. The displacement sensors 208 emit emission waves 502 toward the displacement sensor 202 and receive reflected waves which are returning reflections of the emission waves 502 from the displacement sensors 208. The emission waves may be at least one of electromagnetic waves and ultrasonic waves. The flexible display device 10 may recognize a bending angle of the flexible display panel 100 based on displacements d1 and d2 calculated based on the reflected waves. The electromagnetic waves may comprise infrared rays, laser rays, RF signals, etc. Meanwhile, the displacement sensor may emit the emission waves toward a protruding unit of the flexible display panel and receive reflected waves which are returning reflections of the emission waves from the protruding unit. The flexible display device may recognize a bend angle of the flexible display panel based on a displacement calculated based on the reflected waves. The protruding unit may comprise a displacement sensor. A "protruding unit" may be a structure that is formed with the intention of generating the reflected waves (not shown), or may be a protruding portion formed by a bending of the flexible display panel 100.

In the present embodiment, the displacement sensors 202 and 208 can respectively measure the displacements d1 and d2 by using a time difference between the emission time of the emission waves 501 and 502 and the reception time of the reflected waves. The calculation of the displacements d1 and d2 may be performed by using the following equation 1.

$$d=(t*V)/2 \quad \text{[Equation 1]}$$

The variable t may be a time difference between the emission time of emission waves and the reception time of reflected waves. The variable d may be a displacement. The velocity V may be a velocity of electromagnetic waves or ultrasonic waves. The velocity V may depend on a refractive index of a medium. Because t*V corresponds to a displacement for both directions, traveling to and from, the displacement d can be determined by dividing it by 2.

In the case that the emission waves are ultrasonic waves, the velocity V corresponds to a sound velocity and can be described as in equation 2 below.

$$V=311.5+0.6*T \quad \text{[Equation 2]}$$

In this case, the unit for the velocity V is m/s and the unit for the temperature T is degrees Celsius. The sound velocity in the air may be constant if the temperature T is constant.

In another embodiment, the displacement can be measured by using an incident angle of the reflected waves. For example, in the case of using an optical displacement sensor, the displacement can be measured by the amount of current which is generated when a ray of light arrives at a specific position of a surface of a position sensitive device (PSD) of the optical displacement sensor. The amount of current may be different depending on the specific position of the surface of the PSD. It is obvious to a person of an ordinary skill in the art that different kinds of displacement sensors can be used to implement the present disclosure.

Referring to FIG. 3, the flexible display panel 100 is in a flat state, not in a bent state. The displacement sensor 202 generates the emission waves 501 in a specific direction. In the present embodiment, the specific direction is a horizontal direction from a boundary region in which the displacement sensor 202 is disposed on an opposite boundary region. The emission waves 501 from the displacement sensor 202 will arrive at the displacement sensor 202 as the reflected waves which are reflected from the displacement sensor 208 or other structures. The displacement d1 may be a maximum value which can be measured by the displacement sensor 202 in this embodiment.

The displacement sensor 208 also emits emission waves 502 in a specific direction. The direction of emission waves 501 of the displacement sensor 202 is opposite the direction of emission waves 502 of the displacement sensor 208, because the specific direction is based on a position in which the displacement sensors 202 and 208 are disposed. In another embodiment, the direction of the emission waves 501 and 502 can be different depending on the position of the displacement sensors 202 and 208. The emission waves 502 emitted from the displacement sensor 208 will arrive at the displacement sensor 208 as reflected waves which are reflected from the displacement sensor 202 or other structures. The displacement d2 may be a maximum value which can be measured by the displacement sensor 208 in this embodiment.

The displacement d1 measured by the displacement sensor 202 may be the same as the displacement d2 measured by the displacement sensor 208. Therefore, the flexible display device 10 can recognize that the flexible display panel 100 is currently in a flat, unbent state.

Recognition of the size of displacement or a comparison between a plurality of displacements may be processed either in an analog manner or in a digital manner by using an integrated circuit or a program.

There is a possibility that the precise calculation of the displacement d1 using the displacement sensor 202 will be disturbed by the other emission waves 502 or reflected waves from the other displacement sensor 208. Meanwhile, there is also a possibility that the precise calculation of the displacement d2 using the displacement sensor 208 will be interference from the other emission waves 501 or reflected waves from the other displacement sensor 202. Therefore, in another embodiment, the emitting faces or the position of displacement sensors 202 and 208 can be changed to minimize interference (e.g., positioning in a zigzag pattern). In other embodiments, the displacement sensors 202 and 208 emit the emission waves in a temporally-divided manner or in a frequency-divided manner. Other conventional technologies can be applied to the displacement sensors so that they are not disturbed by each other.

Referring to FIG. 4, a left side of the flexible display panel 100 is in a bent state, and a right side of the flexible display panel 100 is in a flat state.

Emission waves 503 from the displacement sensor 202 will be reflected from a part of the flexible display panel 100. Therefore, displacement d3 measured by the displacement sensor 202 in the case of FIG. 4 will be shorter than the displacement d1 measured in the case of FIG. 3.

Emission waves 504 emitted from the displacement sensor 208 will be reflected from a part of the flexible display panel 100. The part of the flexible display panel 100 in which the emission waves 504 are reflected may not be related to the part of the flexible display panel 100 in which the emission waves 503 are reflected. Likewise, the displacement d4 measured by the displacement sensor 208 will be shorter than the displacement d2 measured in the case of FIG. 3.

The flexible display device 10 can recognize that the displacement d3 is shorter than the displacement d4. Therefore, in the case of FIG. 4, the flexible display device 10 can recognize that the left side of the flexible display panel 100 is bent and the right side of the flexible display panel 100 is in a relatively flat state.

Referring to FIG. 5, the left side and the right side of the flexible display panel 100 are bent according to the same ratio. In other words, the left side and the right side of the flexible display panel 100 have the same bend angle.

The emission waves 505 emitted from the displacement sensor 202 are reflected from a part of the flexible display panel 100. Therefore, the displacement d5 measured by the displacement sensor 202 is shorter than the displacement d1 measured in the case of FIG. 3.

The emission waves 506 emitted from the displacement sensor 208 are reflected from a part of the flexible display panel 100. The part of the flexible display panel 100 in which the emission waves 506 are reflected may not be related to the part of the flexible display panel 100 in which the emission waves 505 are reflected. Likewise, the displacement d6 measured by the displacement sensor 208 is shorter than the displacement d2 in the case of FIG. 3.

The flexible display device 10 can recognize that the displacement d5 is the same as the displacement d6. Therefore, in the case of FIG. 5, the flexible display device 10 can recognize that the left side and the right side of the flexible display panel 100 are bent about the same amount. Furthermore, the flexible display device 10 can recognize the bend angle of each side based on the size of the displacements d5 and d6. The bend angle based on the size of the displacements can be determined with reference to a look-up-table (LUT), which is pre-determined.

Figure 6:
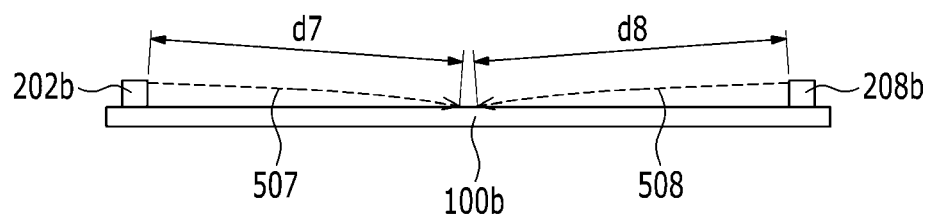
FIGS. 6, 7, and 8 illustrate a method of determining a bend direction of the flexible display device.
Figure 7:
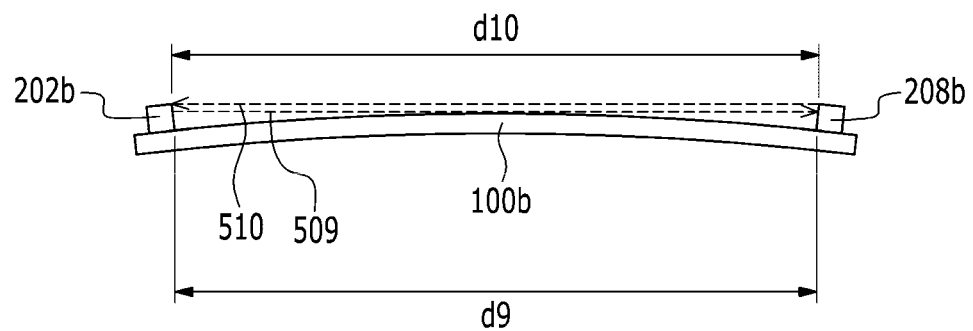
Figure 8:
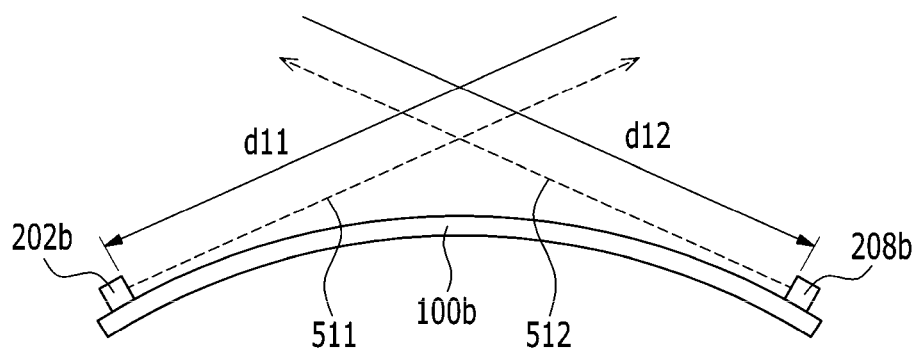

FIGS. 6 to 8 illustrate a method of determining a bend direction of the flexible display device.

Displacement sensors 202b and 208b have different emission directions in comparison to the emission directions of the displacement sensors 202 and 208 in FIGS. 3 to 5. The emission directions of the displacement sensors 202b and 208b are angled downward, pointing toward the flexible display panel 100b instead of being parallel to a surface of the flexible display panel 100b when the flexible display panel 100b is in a flat state, as in the case of displacement sensors 202, 208.

In other words, the emission directions of the displacement sensors 202b and 208b form an angle with respect to the horizontal direction that is parallel to the unbent surface of the flexible display panel 100b.

Referring to FIG. 6, in the case of the flexible display panel 100b in the flat state, the direction of the emission waves 507 of the displacement sensor 202b is toward a part of the flexible display panel 100b. Currently, a measured displacement d7 is not the maximum value that the displacement sensor 202b can measure. In this embodiment, however, the flexible display device can recognize whether the left side of the flexible display panel 100b is in a flat state by comparing the measured displacement d7 with an LUT, which is pre-determined.

Likewise, in the case where the flexible display panel 100b is in the flat state, the direction of the emission waves 508 of the displacement sensor 208b is toward a part of the flexible display panel 100b. Currently, a measured displacement d8 is not the maximum value that the displacement sensor 208b can measure. The flexible display device, however, can recognize whether the right side of the flexible display panel 100b is in a flat state by comparing the measured displacement d8 with the LUT.

Referring to FIG. 7, the flexible display panel 100b is bent in a convex direction.

The direction of the emission waves 509 of the displacement sensor 202b is toward the opposing displacement sensor 208b. In another embodiment, the emission waves from the displacement sensor are emitted toward a protruding unit of the flexible display panel. A measured displacement d9 from the displacement sensor 202b is bigger than the displacement d7 in the case of FIG. 6.

In the same manner, a measured displacement d10 from the displacement sensor 208b is bigger than the displacement d8 in the case of FIG. 6. The flexible display device can determine whether the flexible display panel 100b is currently bent in the convex direction by recognizing the size of the displacements d9 and d10.

In another embodiment, in the case the flexible display panel has a bend angle between that of FIGS. 6 and 7, emission waves emitted from a displacement sensor can have a displacement value between that of FIGS. 6 and 7 because of the reflection from a part of the flexible display panel.

Referring to FIG. 8, the flexible display panel 100b is bent to have a larger curvature in a convex state than the case of FIG. 7.

The emission waves 511 from the displacement sensor 202b may be emitted toward outside of the flexible display panel 100b, without reflection. The emission waves 512 from the displacement sensor 208b may be emitted toward outside of the flexible display panel 100b, without reflection.

In the case the displacement sensors 202b and 208b cannot detect reflected waves or they detect reflected waves with displacements d11 and d12, which are extraordinarily large (e.g., the emission waves were reflected by another object which is not the flexible display panel 100b), the flexible display device can recognize whether the bend direction of the flexible display panel 100b is in a convex direction and the bend angle thereof is bigger than the case of FIG. 7.

Therefore, the flexible display device can determine the bend direction of the flexible display panel 100b based on a change in the displacement, wherein the change may be an increase or a decrease in the length of displacement. In the case of FIGS. 6 to 8, the displacements d7, d9, and d11 measured by the displacement sensor 202b sequentially increase such that d7<d9<d11, and therefore the flexible display device determines whether the left side of the flexible display panel 100b is bent in the convex direction. Furthermore, the displacements d8, d10, and d12 measured by the displacement sensor 208b sequentially increase such that d8<d10<d12, and therefore the flexible display device determines whether the right side of the flexible display panel 100b is bent in the convex direction. In the case of FIGS. 3 to 5, the displacements d1, d3, and d5 measured by the displacement sensor 202 sequentially decrease such that d1>d3>d5, and therefore the flexible display device determines whether the left side of the flexible display panel 100b is bent in the concave direction. Furthermore, the displacements d2, d4, and d6 measured by the displacement sensor 208 sequentially decrease such that d2>d4>d6, and therefore the flexible display device determines whether the right side of the flexible display panel 100b is bent in the concave direction.

In another embodiment, the displacement sensors 202b and 208b have the same emission direction as the horizontal direction of the displacement sensors 202 and 208. In this other embodiment, the flexible display device can still detect whether the flexible display panel is bent in the convex direction. However, in comparison to this other embodiment, in the embodiment of FIGS. 6 to 8, the displacement sensors 202b and 208b, which have the emission direction pointing toward the flexible display panel 100b, may give the flexible display device an opportunity to have more detailed steps with enough time to detect the convex direction of the flexible display panel 100b.

The flexible display device according to the present disclosure can measure the bend angle and, by extension, the bend direction that cannot be measured by conventional flexible display devices which use pressure sensors or resistor sensors.

Figure 9:
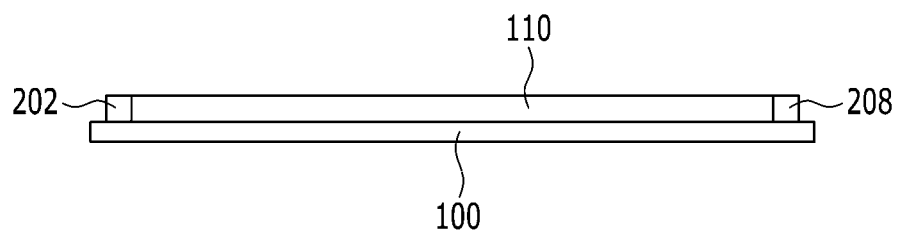
FIG. 9 illustrates the flexible display device further comprising a transparent layer.

FIG. 9 illustrates the flexible display device further comprising a transparent layer.

Referring to FIG. 9, the transparent layer 110 is disposed on the flexible display panel 100, wherein a height of the transparent layer 110 corresponds to a height of the displacement sensors 202 and 208. The transparent layer 110 may comprise polyimide, which has flexibility and transparency.

The transparent layer 110 may prevent a user's finger from feeling the protruding unit, e.g., displacement sensors 202 and 208, and the user will feel that the flexible display device has a smooth surface.

In this embodiment, the refractive index of the transparent layer 110 may be considered in equation 1. In other words, because the medium comprises the transparent layer 110 in this embodiment, the velocity V in equation 1 may be modified by considering the refractive index of the transparent layer 110. The velocity V of equation 1 may be reduced by considering the refractive index of transparent layer 110. As illustrated, the transparent layer may have about the same height as the sensors 202, 208 ("about" meaning within a 5% variation).

FIG. 10 illustrates a method of using a bending of the flexible display device as a user input.

Figure 10A:
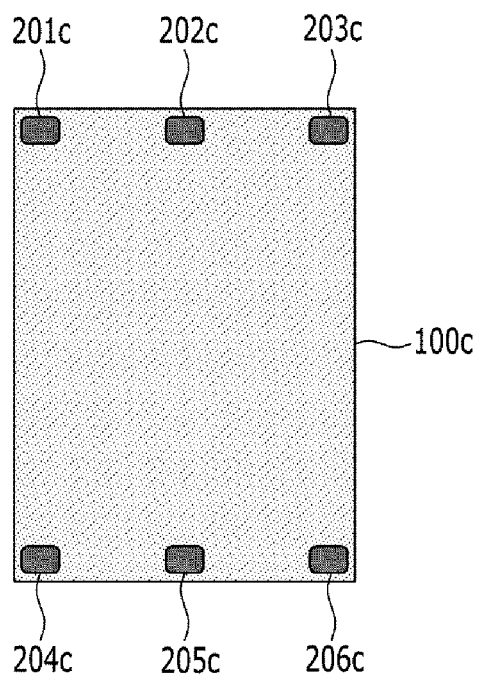
FIGS. 10A, 10B, 10C, 10D, 10E, 10F, 10G, and 10H illustrate a method of using a bending of the flexible display device as a user input.

Referring to FIG. 10A, displacement sensors 201c, 202c, 203c, 204c, 205c, and 206c are disposed on a flexible display panel 100c.

Figure 10B:
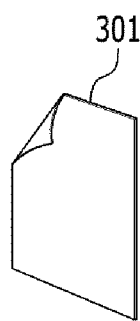

FIG. 10B depicts a display panel 301, which may be similar to the flexible display panel 100c with a corner (e.g., upper left corner) bent. In this case, the displacement sensor 201c may detect a change in the displacement.

Figure 10C:
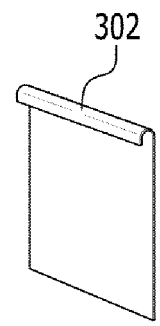

FIG. 10C depicts a display panel 302, which may be similar to the flexible display panel 100c with one end bent or rolled. In this case, the displacement sensors 201c, 202c, and 203c may detect a change in the displacement.

Figure 10D:
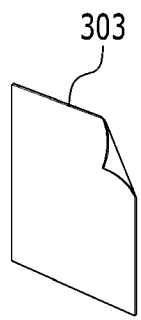

FIG. 10D depicts a display panel 303, which may be similar to the flexible display panel 100c with a different corner (e.g., upper right corner) bent than in the case of FIG. 10B. In this case, the displacement sensor 203c may detect a change in the displacement.

Figure 10E:
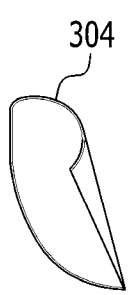

FIG. 10E depicts a display panel 304, which may be similar to the flexible display panel 100c with two corners bent in different directions. In this case, the displacement sensors 203c and 204c may detect a change in the displacement.

Figure 10F:
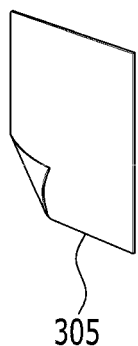

FIG. 10F depicts a display panel 305, which may be similar to the flexible display panel 100c with a third (e.g., lower left) corner bent. In this case, the displacement sensor 204c may detect a change in the displacement.

Figure 10G:
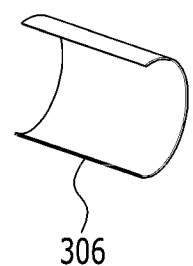

FIG. 10G depicts a display panel 306, which may be similar to the flexible display panel 100c bent in a concave manner. In this case, the displacement sensors 201c, 202c, 203c, 204c, 205c, and 206c may detect a change in the displacement.

Figure 10H:
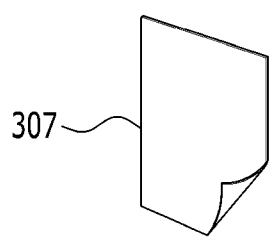

FIG. 10H depicts a display panel 307, which may be similar to the flexible display panel 100c with a fourth corner (e.g., lower right corner) bent. In this case, the displacement sensor 206c may detect a change in the displacement.

Aside from the example states of the display panels 301, 302, 303, 304, 305, 306, and 307 illustrated in FIGS. 10A-H, at least one bent angle and the bend direction can be used as a user input.

Apart from the above-mentioned embodiments, in another embodiment a flexible display device may comprise a first set of a plurality of displacement sensors disposed on a front side of a flexible display panel and a second set of a plurality of displacement sensors disposed on a rear side of the flexible display panel.

The drawings and the detailed description of the present disclosure described above are merely illustrative, are solely used for the purpose of describing the present disclosure, and are not used for qualifying the meaning or limiting the scope of the present invention, which is disclosed in the appended claims.

Therefore, it will be appreciated to those skilled in the art that various modifications and other equivalent embodiments are available.

Accordingly, the actual technical scope of protection for the present disclosure should be determined by the spirit of the appended claims.

DESCRIPTION OF SYMBOLS

10: flexible display device
100: flexible display panel
110: transparent layer
201-212: displacement sensor

What is claimed is:

1. A flexible display device, comprising: a flexible display panel; and
at least one displacement sensor, disposed at a boundary region of the flexible display panel, configured to emit emission waves and receive reflected waves, wherein the reflected waves are emission waves that are returning after being reflected,
measures a displacement by using a time difference between an emission time of the emission waves and a reception time of the reflected waves,
and determine a bend angle of the flexible display panel according to the displacement calculated based on at least one of the reflected waves from flexible display panel,
wherein the displacement sensor is further configured to emit emission waves where at least a portion of each of the emission waves is above a first surface of the flexible display panel and the emission waves are emitted not to be reflected by the flexible display panel when the flexible display panel is in a bent state,
wherein the displacement sensor is further configured to emit the emission waves directly to a protruding unit protruded from the flexible display panel when the flexible display panel is in a flat state, so that the emission waves are reflected by the protruding unit, and
wherein the protruding unit is disposed at the boundary region of the flexible display panel.

2. The flexible display device of claim 1, wherein:
the emission waves are at least one of electromagnetic waves and ultrasonic waves.

3. The flexible display device of claim 1, wherein:
the displacement sensor emits the emission waves to a protruding unit of the flexible display panel, and
the flexible display device calculates the displacement based on the reflected waves, which are returning emission waves that are reflected at the protruding unit.

4. The flexible display device of claim 1, wherein:
the displacement sensor measures the displacement by using at least one of a time difference between an emission time of the emission waves and a reception time of the reflected waves and an incident angle of the reflected waves.

5. The flexible display device of claim 1, wherein:
the displacement sensor is configured to direct the emission waves toward the flexible display panel at an angle with reference to a horizontal direction of the flexible display panel when the flexible display panel is in the flat state.

6. The flexible display device of claim 5, including determining a bend direction of the flexible display panel based on a change in the displacement, wherein the change comprises one of an increase and a decrease.

7. The flexible display device of claim 6, wherein:
the bend direction comprises
a convex direction, wherein the change is an increase; and
a concave direction, wherein the change is a decrease.

8. The flexible display device of claim 1, further comprising a transparent layer, wherein:
the displacement sensor is disposed on the flexible display panel, and
the transparent layer is disposed on the flexible display panel, wherein a height of the transparent layer is about the same as a height of the displacement sensor.

9. The flexible display device of claim 1, wherein:
the displacement sensor is integrally formed within the flexible display panel.

10. The flexible display device of claim 1, further comprising:
a touch panel, disposed on the flexible display panel,
wherein the displacement sensor is integrally formed within the touch panel.

11. The flexible display device of claim 4, further comprising:
a plurality of the displacement sensors,
wherein the plurality of the displacement sensors emit the emission waves in a temporally-divided manner.

12. The flexible display device of claim 4, further comprising:
a plurality of the displacement sensors,
wherein the plurality of the displacement sensors emit the emission waves in a frequency-divided manner.

13. The flexible display device of claim 7,
using at least one of the bend angle and the bend direction as a user input.

14. A driving method of a flexible display device, comprising:
emitting, by using at least one displacement sensor, emission waves, which are at least one of electromagnetic waves and ultrasonic waves, toward a flexible display panel, wherein at least a portion of each of the emission waves is above a surface of the flexible display panel, and the emission waves are emitted not to be reflected by the flexible display panel when the flexible display panel is in a bent state;
receiving reflected waves which are returning reflected emission waves from the flexible display panel;
measuring a displacement by using at least one of a time difference between an emission time of the emission waves and a reception time of the reflected waves; and
determining a bend angle of the flexible display panel based on the displacement,
wherein the displacement sensor is further configured to emit the emission waves directly to a protruding unit protruded from the flexible display panel when the flexible display panel is in a flat state, so that the emission waves are reflected by the protruding unit, and
wherein the protruding unit is disposed at the boundary region of the flexible display panel.

15. The driving method of claim 14, wherein:
the measuring of the displacement comprises:
measuring the displacement by using at least one of a time difference between an emission time of the emission waves and a reception time of the reflected waves and an incident angle of the reflected waves.

16. The driving method of claim 14, further comprising:
emitting the emission waves toward the flexible display panel at an angle with reference to a horizontal direction of the flexible display panel, wherein the flexible display panel is in the flat state.

17. The driving method of claim 14, further comprising:
determining a bend direction of the flexible display panel based on a change in the displacement, wherein the change comprises one of an increase and a decrease.

18. The driving method of claim 17, wherein:
the bend direction comprises
a convex direction, wherein the change is an increase; and
a concave direction, wherein the change is a decrease.

19. The flexible display device of claim 8, wherein:
the displacement is calculated based on equation $d=(t*V)/2$, where t is a time difference between the emission time of at least one emission wave and a reception time of at least one reflected wave, and V is a velocity of one of electromagnetic waves or ultrasonic waves and dependent on a refractive index of the transparent layer.

20. A flexible display device, comprising:
a flexible display panel; and
at least one displacement sensor, disposed at a boundary region of the flexible display panel, configured to emit emission waves and receive reflected waves, wherein the reflected waves are emission waves that are returning after being reflected by the flexible display panel,
measures a displacement by using a time difference between an emission time of the emission waves and a reception time of the reflected waves,
and determine a bend angle of the flexible display panel according to the displacement calculated based on at least one of the reflected waves from flexible display panel,
wherein the displacement sensor is further configured to emit emission waves where at least a portion of each of the emission waves is above a first surface of the flexible display panel and the emission waves are at least one of emitted to be parallel to the surface when the flexible display panel is in a flat state, or directed toward the flexible display panel when the flexible display panel is in a flat state and emitted not to be reflected by the flexible display panel when the flexible display panel is in a bent state,
wherein the displacement sensor is further configured to emit the emission waves directly to a protruding unit protruded from the flexible display panel when the flexible display panel is in a flat state, so that the emission waves are reflected by the protruding unit, and
wherein the protruding unit is disposed at the boundary region of the flexible display panel.

* * * * *